United States Patent
Preuss et al.

(10) Patent No.: US 12,416,240 B2
(45) Date of Patent: Sep. 16, 2025

(54) VANE FORWARD RAIL FOR GAS TURBINE ENGINE ASSEMBLY

(71) Applicant: RTX CORPORATION, Farmington, CT (US)

(72) Inventors: Daniel P. Preuss, Glastonbury, CT (US); Dominic J. Mongillo, Jr., West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/161,472

(22) Filed: Jan. 30, 2023

(65) Prior Publication Data

US 2023/0374908 A1   Nov. 23, 2023

Related U.S. Application Data

(60) Provisional application No. 63/304,198, filed on Jan. 28, 2022.

(51) Int. Cl.
*F01D 9/04* (2006.01)
*F01D 5/18* (2006.01)

(52) U.S. Cl.
CPC .............. *F01D 9/041* (2013.01); *F01D 5/18* (2013.01); *F01D 5/187* (2013.01); *F01D 5/188* (2013.01);
(Continued)

(58) Field of Classification Search
CPC . F01D 9/041; F01D 5/18; F01D 5/187; F01D 5/188; F01D 5/189;
(Continued)

(56) References Cited

U.S. PATENT DOCUMENTS

| | | | |
|---|---|---|---|
| 5,394,687 A | 3/1995 | Chen et al. | |
| 6,227,798 B1 * | 5/2001 | Demers | F01D 9/041 416/232 |

(Continued)

FOREIGN PATENT DOCUMENTS

| | | |
|---|---|---|
| EP | 3112599 A1 | 1/2017 |
| EP | 3323612 A1 | 5/2018 |

(Continued)

OTHER PUBLICATIONS

International Search Report and Written Opinion; International Application No. PCT/US2023/011853; International Filing Date Jan. 30, 2023; Date of Mailing May 4, 2023;9 pages.

(Continued)

*Primary Examiner* — Brian Christopher Delrue
(74) *Attorney, Agent, or Firm* — CANTOR COLBURN LLP

(57) ABSTRACT

Vane assemblies for gas turbine engines are described. The vane assemblies include a platform having an interior platform surface, a forward rail, and an aft rail defining a plenum. An airfoil extends radially inward from the platform on a side opposite the forward and aft rails and includes a leading edge cavity that is open at the platform. A platform feed structure is arranged on the platform about the leading edge cavity and in the plenum and defines a fluid path through the forward rail and into the leading edge cavity. A cover plate is arranged on a top surface of the platform feed structure and configured to fluidly separate the plenum of the platform from the leading edge cavity and define a turning plenum. The cover plate defines a turning contour surface that is shaped to turn an airflow from an axial flow direction to a radial flow direction.

17 Claims, 12 Drawing Sheets

(52) U.S. Cl.
CPC ........ *F01D 5/189* (2013.01); *F05D 2240/121* (2013.01); *F05D 2240/81* (2013.01); *F05D 2250/711* (2013.01); *F05D 2250/712* (2013.01); *F05D 2260/201* (2013.01)

(58) Field of Classification Search
CPC ........... F05D 2240/121; F05D 2240/81; F05D 2250/711; F05D 2250/712; F05D 2260/201
See application file for complete search history.

(56) References Cited

U.S. PATENT DOCUMENTS

| | | | |
|---|---|---|---|
| 6,561,757 | B2 | 5/2003 | Burdgick et al. |
| 6,742,984 | B1 | 6/2004 | Itzel et al. |
| 6,874,988 | B2 | 4/2005 | Tiemann |
| 6,969,233 | B2 | 11/2005 | Powis et al. |
| 8,870,524 | B1 | 10/2014 | Liang |
| 8,961,108 | B2 | 2/2015 | Bergman et al. |
| 9,021,816 | B2 | 5/2015 | Bergman et al. |
| 9,151,164 | B2 | 10/2015 | Tardif et al. |
| 9,222,364 | B2 | 12/2015 | Papple et al. |
| 9,238,969 | B2 | 1/2016 | Batt et al. |
| 9,963,996 | B2 | 5/2018 | Eng et al. |
| 9,982,560 | B2 | 5/2018 | Boeke et al. |
| 10,018,062 | B2 | 7/2018 | Waite et al. |
| 10,385,727 | B2 | 8/2019 | Dutta et al. |
| 10,436,049 | B2 * | 10/2019 | Propheter-Hinckley ............ F01D 5/189 |
| 10,669,887 | B2 | 6/2020 | Allwood |
| 11,078,796 | B2 | 8/2021 | Perron et al. |
| 11,111,823 | B2 | 9/2021 | Jarrossay et al. |
| 11,131,212 | B2 | 9/2021 | Spangler et al. |
| 11,187,092 | B2 * | 11/2021 | McMahon ............... F01D 9/065 |
| 11,415,007 | B2 | 8/2022 | Whittle et al. |
| 2004/0022630 | A1 | 2/2004 | Tiemann |
| 2013/0251508 | A1 | 9/2013 | Tardif et al. |
| 2013/0266416 | A1 | 10/2013 | Bergman et al. |
| 2014/0047843 | A1 | 2/2014 | Papple et al. |
| 2017/0002671 | A1 * | 1/2017 | Waite ........................ F01D 9/02 |
| 2017/0234154 | A1 | 8/2017 | Downs |
| 2019/0032499 | A1 | 1/2019 | Matsuo et al. |
| 2019/0249557 | A1 * | 8/2019 | Allwood ................. F01D 9/065 |
| 2019/0368378 | A1 | 12/2019 | Vantassel et al. |
| 2020/0149401 | A1 | 5/2020 | Propheter-Hinckley |
| 2020/0190991 | A1 | 6/2020 | Propheter-Hinckley |
| 2020/0362711 | A1 * | 11/2020 | McMahon ............... F01D 9/065 |
| 2021/0231022 | A1 * | 7/2021 | Whittle ................... F01D 5/284 |
| 2023/0304412 | A1 * | 9/2023 | Preuss ..................... F01D 5/189 |

FOREIGN PATENT DOCUMENTS

| | | |
|---|---|---|
| EP | 3392462 A1 | 10/2018 |
| WO | 20141433301 A1 | 9/2014 |

OTHER PUBLICATIONS

International Preliminary Report on Patentability for PCT Application No. PCT/US2023/011853, dated Aug. 8, 2024, pp. 1-8.

* cited by examiner

VANE FORWARD RAIL FOR GAS TURBINE ENGINE ASSEMBLY

CROSS-REFERENCE TO RELATED APPLICATIONS

This application claims the benefit of U.S. Provisional Application Ser. No. 63/304,198, filed Jan. 28, 2022, the disclosure of which is incorporated herein by reference in its entirety.

BACKGROUND

The subject matter disclosed herein generally relates to gas turbine engine assemblies and, more particularly, to vane and rail assemblies associated with cooling schemes for airfoils of gas turbine engines.

A gas turbine engine assembly may include one or more vane assemblies, each vane in a respective vane assembly having one or more vane rails. An amount of air flow available to cores or cavities of airfoils accessible via the vane rail varies based on size, shape, and location of the cores or cavities. Airflow access to the cores or cavities is typically provided through drilled channels. Current designs of cores and cavities are configured such that access to vane rail portions to drill to the cores or cavities is difficult and does not necessarily promote efficient air flow.

BRIEF DESCRIPTION

According to some embodiments, vane assemblies for gas turbine engines are provided. The vane assemblies include a platform having an interior platform surface, a forward rail, and an aft rail, wherein the interior platform surface, the forward rail, and the aft rail define a plenum, an airfoil extending radially inward from the platform on a side opposite the forward and aft rails, the airfoil having a leading edge cavity that is open at the platform, a platform feed structure arranged on the platform about the leading edge cavity and in the plenum and defining a fluid path through the forward rail and into the leading edge cavity of the airfoil, and a cover plate arranged on a top surface of the platform feed structure, the cover plate configured to fluidly separate the plenum of the platform from the leading edge cavity and define a turning plenum, wherein the cover plate comprises a turning contour surface that is shaped to turn an airflow from an axial flow direction to a radial flow direction within the turning plenum.

In addition to one or more of the features described herein, or as an alternative, further embodiments of the vane assemblies may include that the platform feed structure has an open top that is defined by a top surface and the cover plate is attached to the top surface.

In addition to one or more of the features described herein, or as an alternative, further embodiments of the vane assemblies may include that the cover plate is attached to the top surface by one of welding, bonding, and adhesive.

In addition to one or more of the features described herein, or as an alternative, further embodiments of the vane assemblies may include that the turning contour defines a dome shape on the cover plate.

In addition to one or more of the features described herein, or as an alternative, further embodiments of the vane assemblies may include that the turning contour defines an apex on the cover plate that is aligned with an inlet and an outlet of the platform feed structure.

In addition to one or more of the features described herein, or as an alternative, further embodiments of the vane assemblies may include that the outlet is aligned with the leading edge cavity of the airfoil.

In addition to one or more of the features described herein, or as an alternative, further embodiments of the vane assemblies may include that the top surface is substantially planar extending from a forward position on an interior rail surface of the forward rail and an aft position on the interior platform surface of the platform.

In addition to one or more of the features described herein, or as an alternative, further embodiments of the vane assemblies may include that the top surface defines a contoured surface extending from a forward position on an interior rail surface of the forward rail and an aft position on the interior platform surface of the platform.

In addition to one or more of the features described herein, or as an alternative, further embodiments of the vane assemblies may include that the contoured surface is convex.

In addition to one or more of the features described herein, or as an alternative, further embodiments of the vane assemblies may include that the contoured surface is concave.

In addition to one or more of the features described herein, or as an alternative, further embodiments of the vane assemblies may include that the platform feed structure comprises an inlet in the forward rail and an outlet in the platform.

In addition to one or more of the features described herein, or as an alternative, further embodiments of the vane assemblies may include that the platform feed structure defines a first feed path through the platform feed structure from the forward rail to the leading edge cavity and a second feed path through the platform feed structure from the forward rail to a platform cooling cavity of the platform.

In addition to one or more of the features described herein, or as an alternative, further embodiments of the vane assemblies may include that the first feed path is defined through a first extension of the platform feed structure and the second feed path is defined through a second extension of the platform feed structure, wherein the cover plate is positioned over a portion of at least the first feed path.

In addition to one or more of the features described herein, or as an alternative, further embodiments of the vane assemblies may include that the first extension and the second extension have different heights relative to the interior platform surface.

In addition to one or more of the features described herein, or as an alternative, further embodiments of the vane assemblies may include that the platform feed structure extends at least 20% of an axial distance between the forward rail and the aft rail.

In addition to one or more of the features described herein, or as an alternative, further embodiments of the vane assemblies may include that the platform feed structure extends between 20% and 70% of an axial distance between the forward rail and the aft rail.

In addition to one or more of the features described herein, or as an alternative, further embodiments of the vane assemblies may include that the platform feed structure extends less than 20% of an axial distance between the forward rail and the aft rail.

In addition to one or more of the features described herein, or as an alternative, further embodiments of the vane assemblies may include that the airfoil comprises an aft cavity arranged aft of the leading edge cavity, wherein the aft cavity is fluidly connected to the plenum of the platform.

In addition to one or more of the features described herein, or as an alternative, further embodiments of the vane assemblies may include that the platform is an outer diameter platform and the airfoil extends radially inward to an inner diameter platform.

In addition to one or more of the features described herein, or as an alternative, further embodiments of the vane assemblies may include that the platform feed structure is sized to allow a baffle to pass therethrough to install the baffle within the leading edge cavity of the airfoil.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
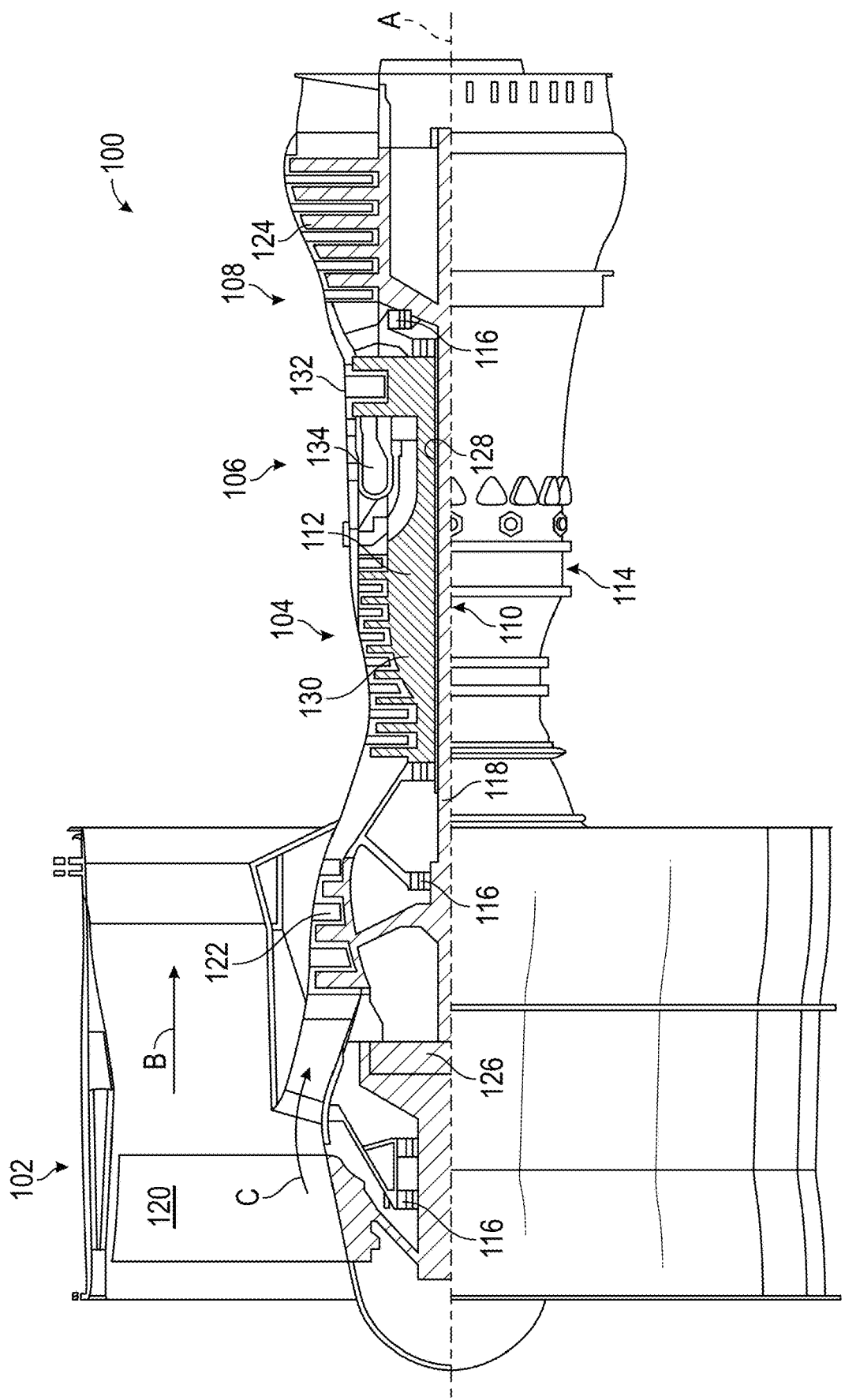
FIG. 1 is a schematic illustration of a gas turbine engine that may employ embodiments of the present disclosure.

A detailed description of one or more embodiments of the disclosed apparatus and method are presented herein by way of exemplification and not limitation with reference to the Figures. As shown and described herein, various features of the disclosure will be presented. Various embodiments may have the same or similar features and thus the same or similar features may be labeled with the same reference numeral, but preceded by a different first number indicating the figure to which the feature is shown. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 schematically illustrates a gas turbine engine 100. The gas turbine engine 100 is disclosed herein as a two-spool turbofan that generally incorporates a fan section 102, a compressor section 104, a combustor section 106, and a turbine section 108. FIG. 1 is one example of a gas turbine engine that may incorporate embodiments of the present disclosure. However, alternative engine configurations that may incorporate embodiments described herein may include other systems, features, and/or arrangement of components, as will be appreciated by those of skill in the art. The fan section 102 is configured to drive air along a bypass flow path B in a bypass duct, while the compressor section 104 is configured to drive air along a core flow path C for compression and communication into the combustor section 106 then expansion through the turbine section 108. Although depicted as a two-spool turbofan gas turbine engine in the disclosed non-limiting embodiment, it should be understood that the concepts described herein are not limited to use with two-spool turbofans as the teachings may be applied to other types of turbine engines without departing from the scope of the present disclosure.

The gas turbine engine 100 generally includes a low speed spool 110 and a high speed spool 112, each spool mounted for rotation about an engine central longitudinal axis A relative to an engine static structure 114 via one or more bearing systems 116. It should be understood that various bearing systems 116 at various locations may alternatively or additionally be provided, and the location of such bearing systems may be varied as appropriate to the application and/or engine configuration.

The low speed spool 110 generally includes an inner shaft 118 that interconnects a fan 120, a low pressure compressor 122, and a low pressure turbine 124. The inner shaft 118 is connected to the fan 120 through a speed change mechanism, which in the configuration of the gas turbine engine 100 shown in FIG. 1 is illustrated as a geared architecture 126 to drive the fan 120 at a lower speed than the low speed spool 110. The high speed spool 112 includes an outer shaft 128 that interconnects a high pressure compressor 130 and high pressure turbine 132. A combustor 134 is arranged in the gas turbine engine 100 between the high pressure compressor 130 and the high pressure turbine 132. The engine static structure 114 is configured to support the bearing systems 116. The inner shaft 118 and the outer shaft 128 are concentric and rotate via the bearing systems 116 about the engine central longitudinal axis A which is collinear with their longitudinal axes.

In operation, the core airflow in the core airflow path C is compressed by the low pressure compressor 122, then the high pressure compressor 130, mixed and burned with fuel in the combustor 134, then expanded over the high pressure turbine 132, and finally the low pressure turbine 124. The turbines 134, 124 may be configured to rotationally drive the low speed spool 110 and the high speed spool 112, respectively, in response to the expansion of the core airflow along the core airflow path C. It will be appreciated that each of the positions of the fan section 102, the compressor section 104, the combustor section 106, the turbine section 108, and the fan drive gear system (e.g., geared architecture 126) may be varied relative to each other. For example, in some non-limiting configurations, the geared architecture 126 may be located aft of the combustor section 106 or even aft of the turbine section 108, and the fan section 102 may be positioned forward or aft of the location of the geared architecture 126.

The gas turbine engine 100, in one non-limiting example, is a high-bypass geared aircraft engine. In some examples, a bypass ratio of the gas turbine engine 100 may be greater than about six (6), with an example embodiment being greater than about ten (10). In some embodiments, the geared architecture 126 may be an epicyclic gear train, such as a planetary gear system or other gear system, with a gear reduction ratio of greater than about 2.3 (2.3:1). In some embodiments, the low pressure turbine 124 may have a pressure ratio that is greater than about five (5). In one embodiment, a bypass ratio of the gas turbine engine 100 may be greater than about ten (10:1). In some embodiments, a diameter of the fan 120 may be significantly larger than that of the low pressure compressor 122. In some embodiments, the low pressure turbine 124 may have a pressure ratio that is greater than about five (5:1). A pressure ratio of the low pressure turbine 124 is a pressure measured prior to an inlet of low pressure turbine 124 as related to a pressure at the outlet of the low pressure turbine 124 prior to an exhaust nozzle or other downstream component. It should be understood that the above parameters are only exemplary of one embodiment of a geared architecture engine and that the present disclosure is applicable to other gas turbine engines including, but not limited to, direct drive turbofans.

In some embodiments, a significant amount of thrust is provided by the bypass flow B due to a high bypass ratio. The fan section 102 of the gas turbine engine 100 may be designed for particular flight condition(s)—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \degree R)/(518.7\degree R)]^{0.5}$. The "Low corrected fan tip speed" as disclosed herein according to one non-limiting embodiment is less than about 1150 ft/second (350.5 m/sec). the gas turbine engine 100 of FIG. 1 may be configured with one or more components as shown and described herein.

Figure 2:
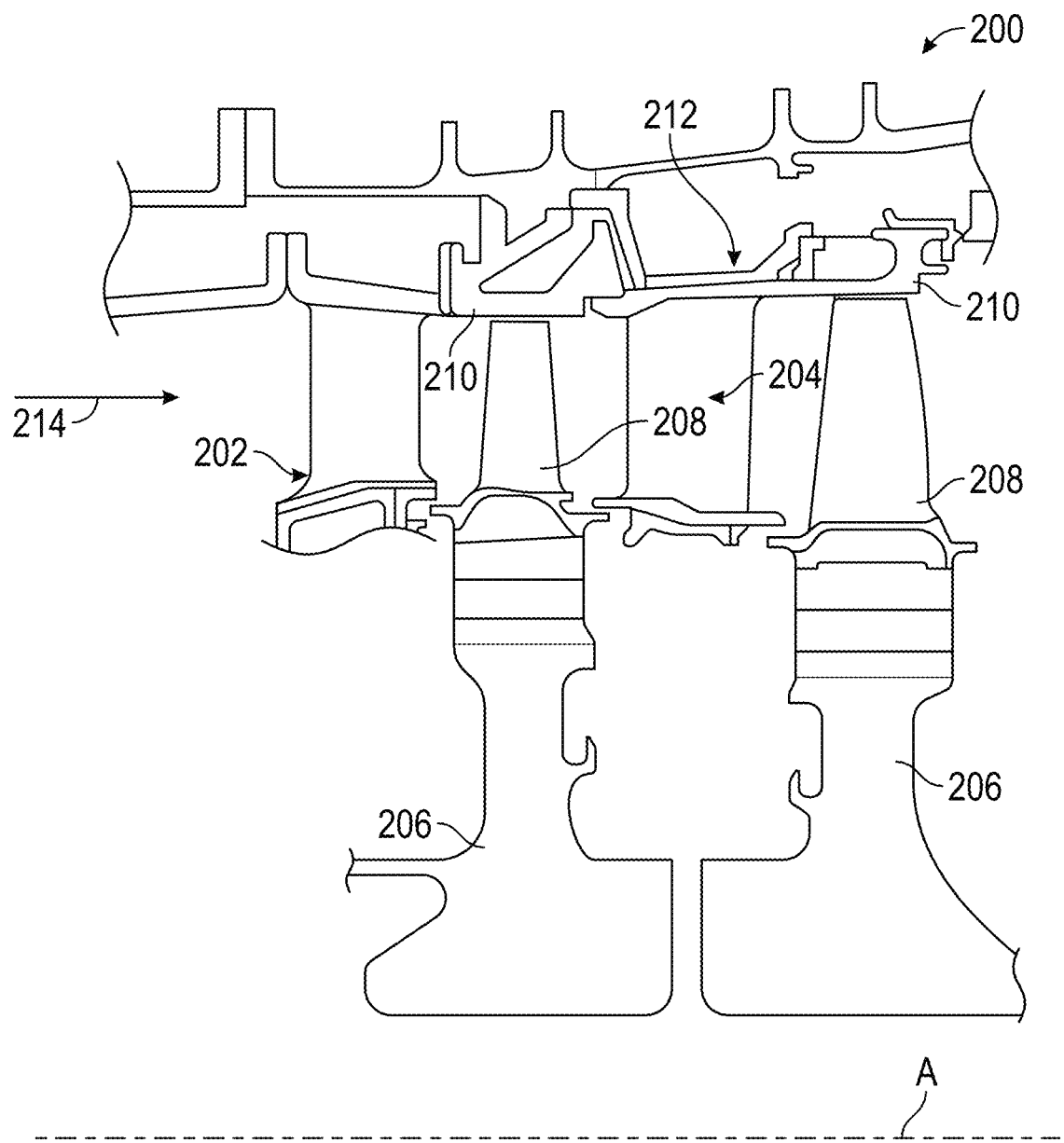
FIG. 2 is a schematic illustration of an engine section of a gas turbine engine that may incorporate embodiments of the present disclosure.

Referring now to FIG. 2, a schematic illustration of an engine section 200 of a gas turbine engine that can incorporate embodiments of the present disclosure is shown. The engine section 200 shown in FIG. 2 may be illustrative of a portion of a turbine section or a compressor section of a gas turbine engine, such as shown and described above with respect to FIG. 1. The engine section 200 includes a first stage vane 202 and a second stage vane 204. The first stage vane 202 is located forward of a first one of a pair of turbine disks 206. Each of the turbine disks 206 includes a plurality of turbine blades 208 secured thereto. The turbine blades 208 are configured to rotate proximate to blade outer air seals 210 at tips thereof In this illustrative configuration, the blade outer air seals 210 are located aft of the first stage vane 202. The second stage vane 204 is located between the pair of turbine disks 206.

In one non-limiting example, the first stage vane 202 is the first vane of a high pressure turbine section that is located aft of a combustor section (see., e.g., FIG. 1). The second stage vane 204 is located aft of the first stage vane 202 between the pair of turbine disks 206. The second stage vane 204 and the first stage vane 202 are located circumferentially about an engine central longitudinal axis A to provide a stator assembly 212. Hot gases from the combustor section are configured to flow through the engine section 200 in a direction of arrow 214, thus the hot gases first interact with the first stage vane 202 and then subsequently with the second stage vane 204, in a flow path direction. Although a two-stage (e.g., two vane sections) system is illustrated, other engine sections/configurations are considered to be within the scope of various embodiments of the present disclosure.

Figure 3:
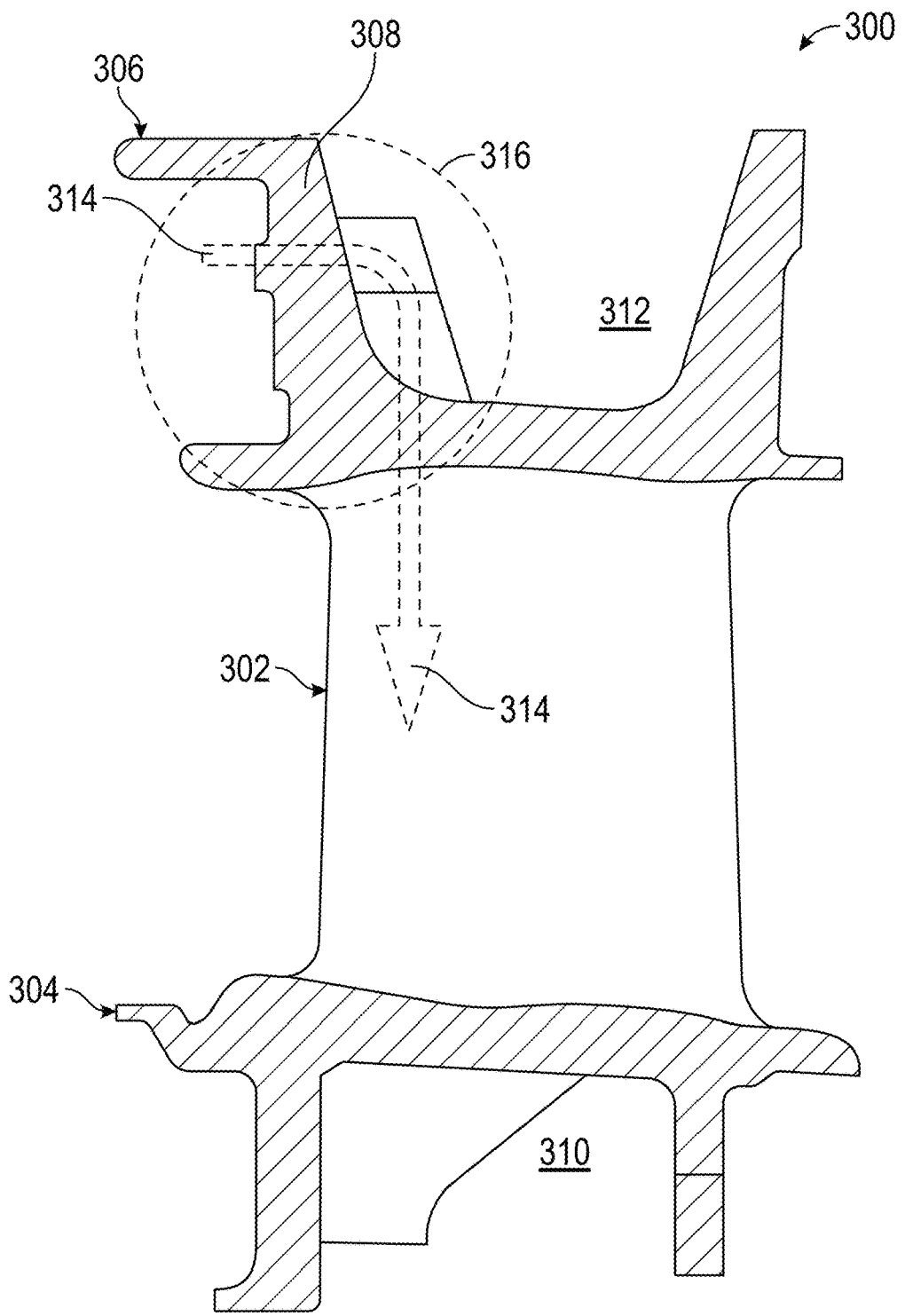
FIG. 3 is a schematic illustration of a vane assembly that may incorporate embodiments of the present disclosure.

Referring now to FIG. 3, a side view of a portion of an example of a vane assembly 300 that may be implemented within gas turbine engines is schematically shown. The vane assembly 300, as shown, includes an airfoil 302 disposed between an inner diameter platform 304 and an outer diameter platform 306. The vane assembly 300 may include a vane forward rail 308 that is configured to engage with other parts of an engine assembly (e.g., hooks or the like). The vane assembly 300 may be located within a compressor section or a turbine section as described above. The airfoil 302 extends in a radial direction (relative to an engine axis). Cooling air for the airfoil 302 may be supplied into one or more internal cavities of the airfoil 302. The cooling air may be directed into the internal cavities of the airfoil 302 from an inner diameter plenum 310 or an outer diameter plenum 312. In some configurations and as shown, a cooling airflow 314 may be directed through the forward rail 308 and into the internal cavities of the airfoil 302 through a platform feed structure 316. The platform feed structure 316 may be configured to receive the cooling airflow 314 from an upstream location, pass the cooling airflow 314 through the forward rail 308, turn such airflow 314 within the platform feed structure 316, and into one or more internal cavities of the airfoil 302 (e.g., leading edge and midbody cavities) and/or into internal cavities and channels within the outer diameter platform 306 to provide cooling thereto.

Due to airfoil sizes and/or other engine system considerations, a flow allotment and pressure level consistent with existing configurations may not be sufficient to cool next generation designs using traditional leading edge cooling configurations (e.g., discrete leading edge cavities and/or impingement baffles). Additionally, structural concerns may require maximizing a distance between a leading edge of the airfoil and a first rib within the airfoil (e.g., defining a leading edge cavity of the airfoil). When implemented, the cooling airflow 314 will enter the platform area (e.g., at the vane forward rail 308) perpendicular to the airfoil cavity (e.g., left-to-right on FIG. 3). As such, the airflow 314 will have to be directed or turned downward (e.g., radially inward) into at least one cooling cavity or cavities of the airfoil 302. In certain situations, some airfoil cooling configurations may require a feed system that allows for a baffle to be inserted into the airfoil cavity with a perpendicular feed. Furthermore, consideration of the platform feed structure 316 must also leave enough clearance in the outer diameter plenum 312 to allow turbine cooling and leakage air (TCLA) cooling air pipes to pressurize the outer diameter plenum 312 to the required supply pressure necessary to provide adequate cooling air mass flow to all platform and airfoil cooling circuits in order to meet thermal performance and durability life requirements. Additionally, debris in current/existing configurations has demonstrated plugged feeds, which can starve the entire leading edge circuit of the airfoil, which in turn can lead to premature platform and airfoil oxidation, thermal mechanical fatigue, and creep distress failure modes.

In accordance with embodiments of the present disclosure, platform feed structures are provided to extend from a platform surface to a feed radius location. Such structures may extend in an aftward direction and back toward a trailing edge rail to allow the option for a leading edge baffle to be installed within the airfoil of the vane assembly. The structures described herein are designed such that a baffle may be inserted through the outer diameter platform of the airfoil assembly and into the interior of the airfoil structure. In some configurations, the airfoil has a curvature in the circumferential direction (i.e., defining the airfoil surfaces), which in turn requires the installed baffle to be curved both tangentially and/or axially as well. This curvature can result in an upper limit of the platform feed structures before the structure itself will interfere with installation of the baffle. By minimizing the structural size of the platform feed structures, a reduction of cross-sectional area within the platform cooling area and minimizing the amount of material present for both structural and weight benefits may be achieved. The platform feed structures may have axial lengths (e.g., extending aft from a forward rail) that are selected to accommodate the installation of a baffle through the structure and into an airfoil. It will be appreciated that the tangential and axial bow of a vane aerodynamic geometry may limit the radial height and an axial extent of an outer diameter leading edge, mid body, and/or trailing edge radially oriented feed cavity structure, due to interference between the outer diameter feed cavity structure and a bowed baffle geometry when inserted into the airfoil during the vane assembly process.

Further, in accordance with some embodiments of the present disclosure, the platform feed structure may be shaped to angle or otherwise direct a flow downward (e.g., radially inward) into a leading edge circuit of the airfoil. In accordance with some embodiments, the platform feed structures of the present disclosure may be sized and shaped to ensure that an outer diameter plenum projected cross-sectional area is not disrupted significantly or negatively that may increase circumferential pressure losses within the outer diameter plenum that is configured to supply cooling air to the entire annulus of the vane assembly from discrete circumferential locations. An axial length (i.e., a direction along an engine axis) extends from a leading edge rail toward a trailing rail of the platform for a distance large enough to enable installation of a baffle into the airfoil of the vane assembly. Such axial length or distance can also accommodate turning of a cooling flow 90° without significant losses.

To minimize pressure losses associated with a 90° turn from the axial feed inlet to the radially extending airfoil cooling cavities, it may be desirable to minimize flow separation that naturally occurs when cooling airflow is turned 90° immediately upstream the airfoil outer diameter inlet cooling feed cavities. It may also be desirable to ensure cooling mass flow uniformity along the axial and circumferential inlet flow plane (or outer diameter airfoil inlet feed) which is oriented nearly parallel to the centerline of the engine axis and is coincident with the outer diameter of the airfoil platform intersection. Ensuring mass flow velocity and pressure uniformity at the inlet of the outer diameter of the airfoil cooling cavities may reduce airfoil feed inlet pressure losses, improve airfoil cavity fill characteristics, and/or increase local convective cooling performance along the outer diameter airfoil-platform fillet region.

In some embodiments, the turning of the flow may be controlled or dictated by a shaped or contoured cover plate that may be formed to capture or catch the axial cooling flow fed through inlet feed apertures in the leading edge forward rail structure and turn the flow (passively) along a contoured surface of the cover plate. Such control may mitigate an axial velocity flow jetting and flow separation that would naturally occur with cooling flow that is moving axially and required to turn 90° to onboard into the radially oriented vane turbine airfoil inlet. Further, in addition to creating a plenum and turning airflow, the platform feed structures allow the use of a relatively large slot feed aperture on the vane forward rail (e.g., vane forward rail 308). Incorporation of larger cross-sectional feed apertures may permit debris in the cooling air feed system to pass through without clogging the feed aperture/slot. Additionally, such relatively large slots/openings can minimize inlet pressure losses, allowing the use of more pressure within the airfoil for cooling. Prior configurations were subject to significant pressure losses at the inlet, which some embodiments and configurations described herein address by reducing or eliminating such losses.

Figure 4A:
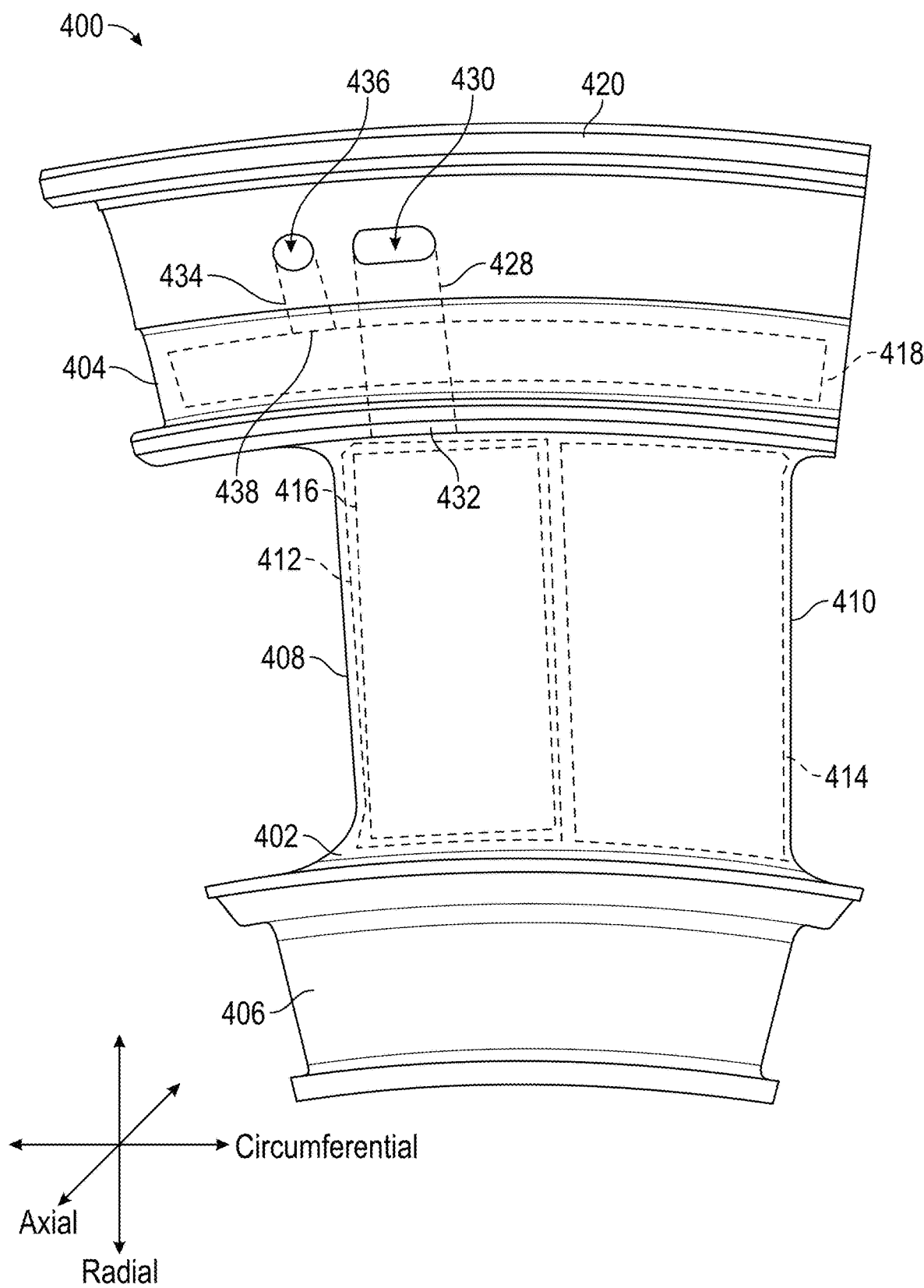
FIG. 4A is a schematic illustration of a vane assembly in accordance with an embodiment of the present disclosure.
Figure 4B:
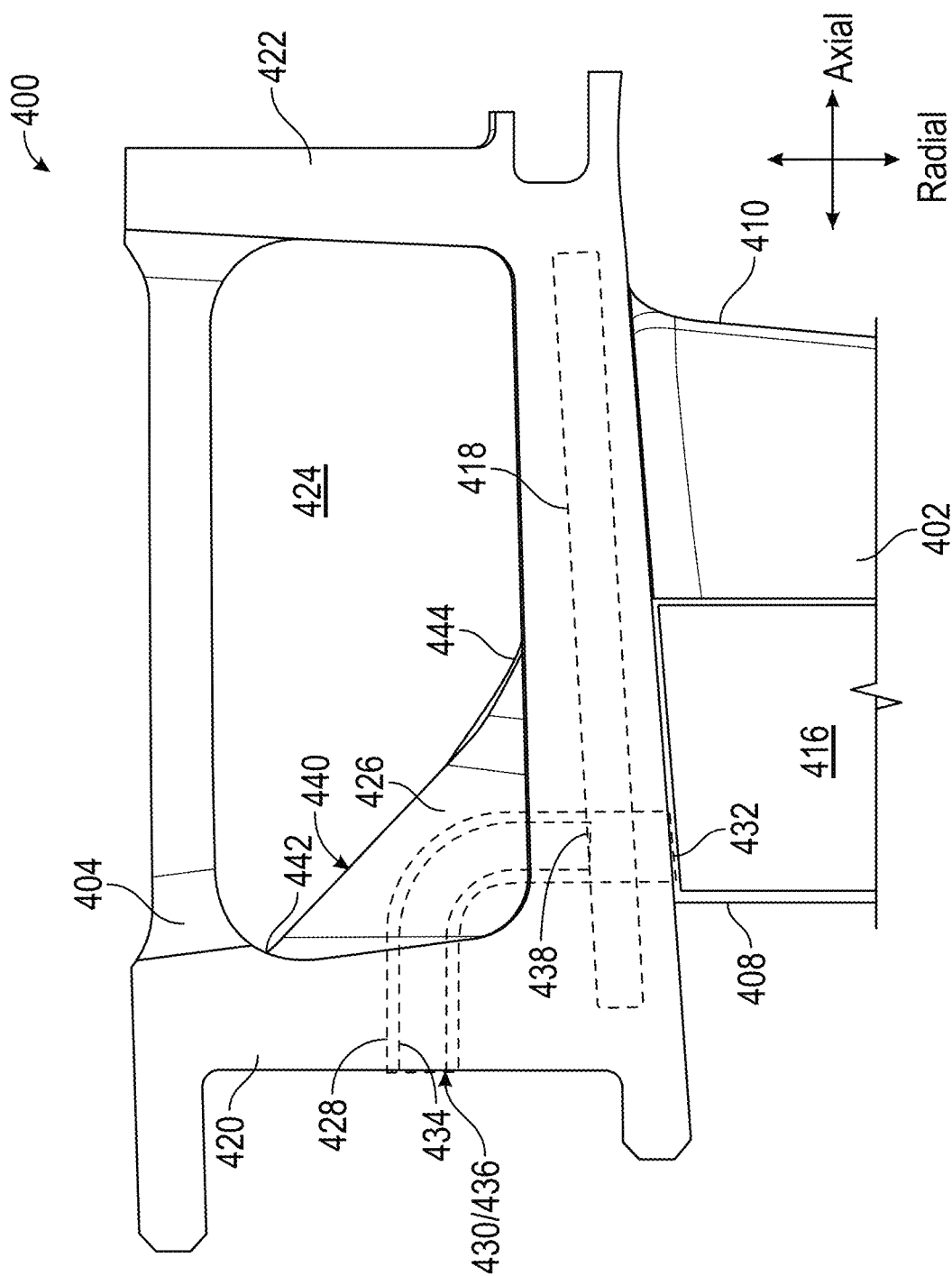
FIG. 4B is a side schematic illustration of a portion of the vane assembly of FIG. 4A.
Figure 4C:
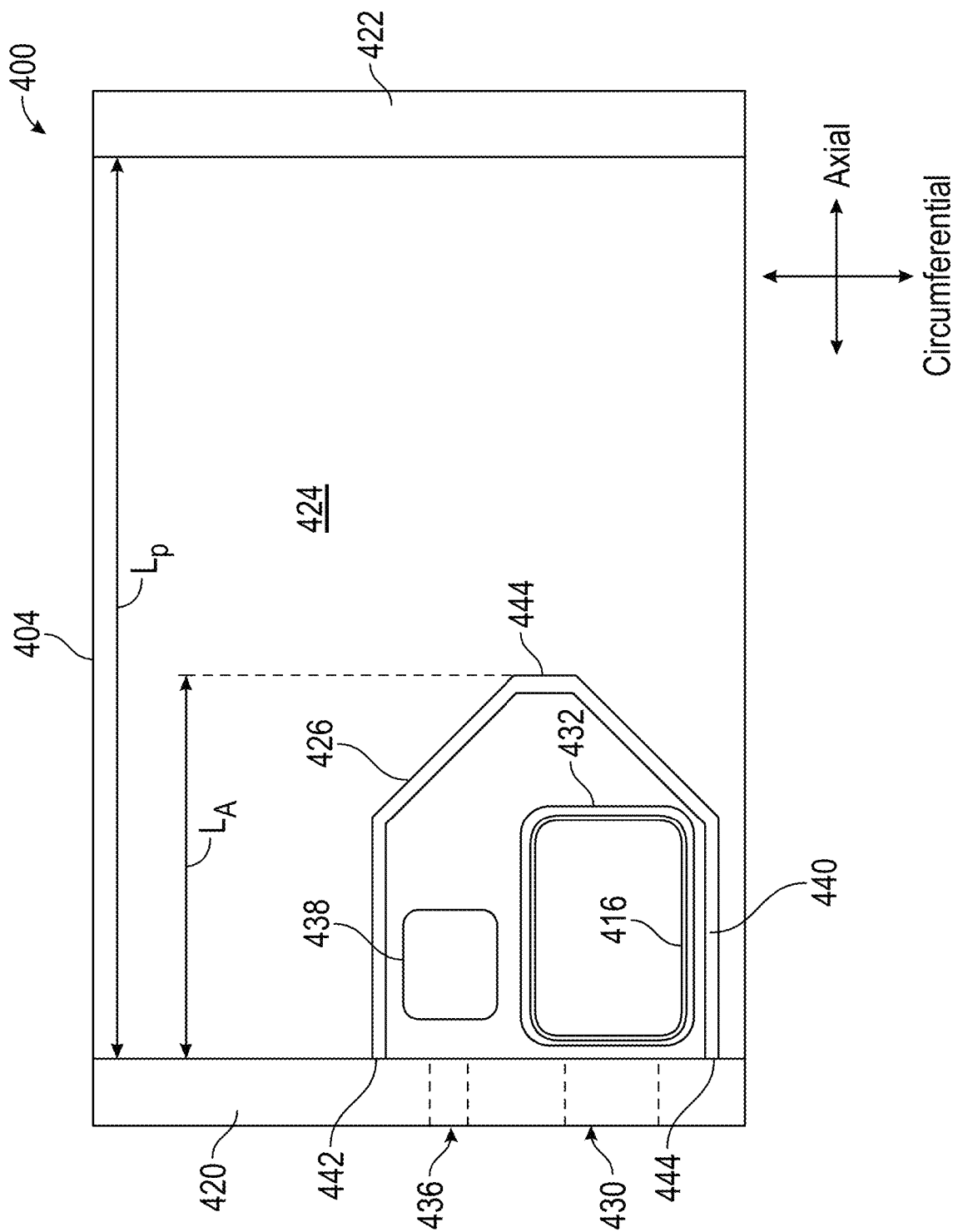
FIG. 4C is top-down (radially inward) view of the vane assembly of FIG. 4A.

Turning now to FIGS. 4A-4C, schematic illustrations of a vane assembly 400 in accordance with an embodiment of the present disclosure are shown. The vane assembly 400 includes an airfoil 402 disposed between an outer diameter platform 404 and an inner diameter platform 406. The airfoil 402 has a leading edge 408 and a trailing edge 410. The airfoil 402, in this embodiment, includes a leading edge cavity 412 and a trailing edge cavity 414 that are configured to receive cooling air and provide cooling to the airfoil 402. In this embodiment, a baffle 416 is arranged within the leading edge cavity 412 to serve as a space-eater component and to receive and direct cooling air onto internal surfaces of the airfoil 402. The airfoil 402 may be integrally formed with the outer diameter platform 404 and the inner diameter platform 406 to form the vane assembly 400. The outer diameter platform 404 may include a platform cooling cavity 418 which is arranged to cool portions of the outer diameter platform 404 exposed to hot gaspath air. Although not expressly shown, the trailing edge cavity can include a baffle and/or may be arranged as a serpentine flow path, as will be appreciated by those of skill in the art. Further, the inner diameter platform 406 may include internal cavities for cooling thereof, as will be appreciated by those of skill in the art.

As shown in FIGS. 4A-4C, the outer diameter platform 404 includes a forward rail 420 and an aft rail 422. An outer diameter plenum 424 is defined between the forward rail 420 and an aft rail 422. The outer diameter platform 404 includes a platform feed structure 426 formed as part of the outer diameter platform 404 and positioned within the outer diameter plenum 424. The platform feed structure 426 is a structure of the outer diameter platform 404 that has one or more feed paths defined therethrough. A first feed path 428 extends between an inlet 430 in the forward rail 420 and an outlet 432 that directs cooling air into the baffle 416. A second feed path 434 extends between an inlet 436 in the forward rail 420 and an outlet 438 that directs cooling air into the platform cooling cavity 418.

Although prior platform feed structures have existed, the platform feed structure 426 of the present embodiment is significantly enlarged as compared to such prior configurations. For example, in an axial direction (e.g., in a direction between the forward rail 420 and the aft rail 422), the length or extent of the platform feed structure 426 may be sized to allow for the installation of a baffle within the airfoil (vane) extending from the platform. Further, for example, in a circumferential direction (e.g., pressure-to-suction direction relative to the airfoil) the size may be increased relative to prior configurations to enable an enlarged feed slot to reduce plugging and/or pressure losses.

For example, and in accordance with some embodiments of the present disclosure and without limitation, an axial length $L_A$ of the platform feed structure 426 may extend at least 20% of the axial distance $L_P$ of the platform 404 between the forward rail 420 and the aft rail 422. In some non-limiting configurations, the axial length $L_A$ may be between 20% and 70% of the axial distance $L_P$ of the platform 404. This increased distance (e.g., as compared to prior configurations having a profile in the axial direction of less than 10%) allows for improved turning of cooling flow that must change from an axial flow direction to a radial flow direction (e.g., 90° turn) as the cooling flow enters the outer diameter airfoil inlet feed cavities. The platform feed structure 426 is sized to accommodate installation of a baffle into the airfoil and may enable a smoother fluid transition from an axial flow direction to a radial flow direction while also minimizing impacts on crossflow through the outer diameter plenum 424, and increased pressure losses, and/or plugging at the leading-edge rail inlet feed apertures 430, 436. The axial extent may also be controlled, at least in part, based on the size and shape of the baffle to be installed within the airfoil.

Because the platform feed structure 426 extends for a larger axial distance than prior configurations, to minimize impacts on crossflow through the outer diameter plenum 424, a top surface 440 of the platform feed structure 426 may be angled from a forward position 442 on the forward rail 420 to an aft position 444 on the outer diameter platform 404. The top surface 440 may be substantially linear from the forward position 442 to the aft position 444. However, in other embodiments, the top surface 440 may have a curvature or non-linear slope from the forward position 442 to the aft position 444, such as resulting in a concave or convex surface.

As noted, advantages of the increased axial length include the ability to have an airfoil with a baffle installed therein. In conventional configurations, the airfoil feed inlet cross-sectional area openings and limitations associated with the platform radially extending feed structures may be insufficient to allow for baffle installation. That is, the hole sizes are too small to accommodate a baffle to be installed therethrough and into the interior cavity of the airfoil. However, in contrast, the platform feed structure 426 of the present disclosure has a large enough size to accommodate the insertion of the baffle 416 through the opening defined by the outlet 432 and into the leading edge cavity 412 of the airfoil 402. That is, the outlet 432 of the platform feed structure 426 is sized to allow for the baffle 416 to pass therethrough to be installed within the leading edge cavity 412 of the airfoil 402.

Embodiments of the present disclosure are directed to enlarged platform feed structures (e.g., smokestacks) that allow for the insertion of a baffle for more complex cooling circuits within airfoils of vane assemblies. The platform feed structures have a forward end that mates up against the front rail of the platform, where the cooling air is introduced. This allows the feed slot (inlet) to be enlarged to a width (circumferential direction) of the platform feed structure or at least associated inlet (e.g., inlet 430). For example, as compared to prior configurations, the inlet area may be doubled in size (cross-sectional area) to prevent particle accumulation. In one non-limiting example, the cross-sectional area at the inlet (e.g., inlet 430) may be about 0.025 sq-in or greater, such as about 0.03 sq-in, about 0.04 sq-in, about 0.05 sq-in, or greater. It will be appreciated that the aforementioned cross-sectional areas are merely for example and are not to be limiting on the size of such inlet areas, but rather provide some examples and information regarding such larger size inlets as compared to prior configurations. The platform feed structure can be extended in the circumferential direction (e.g., to allow larger feed area to minimize pressure loss and plugging risk) and in the axial direction (e.g., to allow a circuit to cover more or less airfoil surface area depending on cooling requirements).

Figure 5:
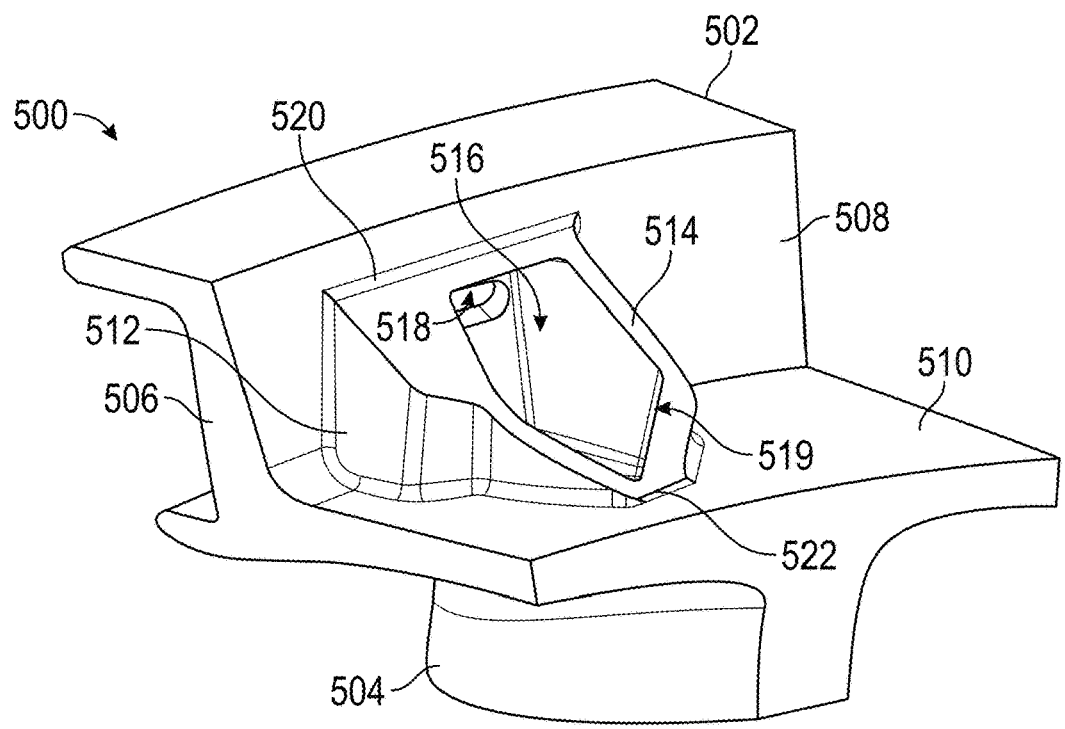
FIG. 5 is a schematic illustration of a vane assembly in accordance with an embodiment of the present disclosure.

Turning now to FIG. 5, a schematic illustration of a vane assembly 500 in accordance with an embodiment of the present disclosure is shown. The vane assembly 500 may be similar to that shown and described above. For example, the vane assembly 500 includes an outer diameter platform 502 and an airfoil 504 extending radially inward from the outer diameter platform 502. The outer diameter platform 502 includes a forward leading edge rail 506 having an interior rail surface 508 and an interior platform surface 510. The interior rail surface 508 and the interior platform surface 510 define, in part, an outer diameter plenum, similar to that shown and described above.

The vane assembly 500 includes a platform feed structure 512. The platform feed structure 512 is configured to define a flow path for cooling air that passes through the forward leading edge rail 506 and into an interior of, at least, the airfoil 504 (specifically a baffle installed within the airfoil 504). The platform feed structure 512 has a top surface 514 that defines a turning plenum 516 therein. The platform feed structure 512 is a structure that is integrally formed with the material of the outer diameter platform 502. Cooling air will enter into the turning plenum 516 from an inlet aperture 518 and is turned within the platform feed structure 512 from an axial flow to a radial flow. The turned flow will be directed into an airfoil body, and in some embodiments, into a baffle that is arranged and positioned within an airfoil body (e.g., within a cavity of the airfoil 504). Although not shown, the platform feed structure 512 may include a separate (second) inlet for receiving cooling air and directing such air into one or more cooling cavities of the outer diameter platform 502.

The platform feed structure 512 has an open top 519 that is defined by the top surface 514 and the turning plenum 516. The open top 519 is sized and shaped to permit a baffle to pass through the platform feed structure 512 and to be installed within an internal cavity of the airfoil 504 (e.g., a leading edge cavity). In some embodiments, the open top 519 (e.g., open area at the top of the radially oriented platform feed structure 512) may be capped or covered with a cover plate (not shown). The top surface 514, in this embodiment, is substantially planar and angled, which provides advantages to producibility (e.g., installation of the cover plate, pulling a cast, etc.). As such, the top surface 514 is defined within a plane that extends through a forward position 520 on the interior rail surface 508 of the forward leading edge rail 506 and an aft position 522 on the interior platform surface 510 of the platform 502.

Figure 6:
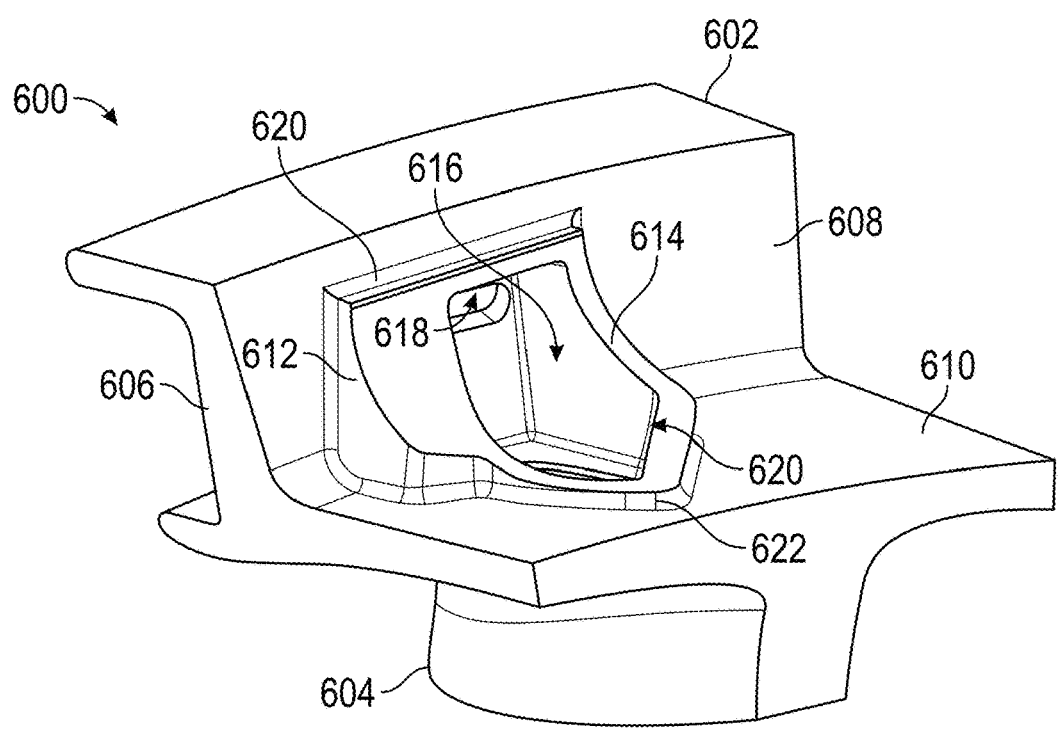
FIG. 6 is a schematic illustration of a vane assembly in accordance with an embodiment of the present disclosure.

Turning now to FIG. 6, a schematic illustration of a vane assembly 600 in accordance with an embodiment of the present disclosure is shown. The vane assembly 600 may be similar to that shown and described above. For example, the vane assembly 600 includes an outer diameter platform 602 and an airfoil 604 extending radially inward from the outer diameter platform 602. The outer diameter platform 602 includes a forward rail 606 having an interior rail surface 608 and an interior platform surface 610. The interior rail surface 608 and the interior platform surface 610 define, in part, an outer diameter plenum, similar to that shown and described above.

The vane assembly 600 includes a radially oriented platform feed structure 612. The platform feed structure 612 is configured to define a flow path for cooling air that passes through the forward rail 606 and into an interior of, at least, the airfoil 604 (specifically a baffle installed within the airfoil 504). The platform feed structure 612 has a top surface 614 that defines a turning plenum 616 therein. The platform feed structure 612 is a structure that is integrally formed with the material of the outer diameter platform 602. Cooling air will enter into the turning plenum 616 from an inlet 618 and is turned within the platform feed structure 612 from an axial flow to a radial flow. The turned flow will be directed into an airfoil body, and in some embodiments, into a baffle that is arranged and positioned within an airfoil body (e.g., within a cavity of the airfoil 604). Although not shown, the platform feed structure 612 may include a separate (second) inlet for receiving cooling air and directing such air into one or more cooling cavities of the outer diameter platform 602.

The platform feed structure 612 has an open top 620 that is defined by the top surface 614 and the turning plenum 616. The open top 620 is sized and shaped to permit a baffle to pass through the platform feed structure 612 and to be installed within an internal cavity of the airfoil 604 (e.g., a leading edge cavity). In some embodiments, the open top 620 (e.g., open area at the top of the radially oriented platform feed structure 612) may be capped or covered with a cover plate (not shown). The top surface 614, in this embodiment, is curved or contoured. That is, the top surface 614 is defined by a curved plane that extends through a forward position 620 on the interior rail surface 608 of the forward rail 606 and an aft position 622 on the interior platform surface 610 of the platform 602. The resulting top surface 614 is a substantially concave surface that the cross-sectional area of the platform feed structure 612 is less than a cross-sectional area of the platform feed structure 512 of FIG. 5. It will be appreciated that the top surface of the radially oriented platform feed cavity may also incorporate a convex surface opposite of the curvature illustrated in FIG. 6, without departing from the scope of the present disclosure. In such embodiments, the top surface of the platform feed structure may be convex and bow outward (e.g., radially outward) as compared to the bowing radially inward as illustrated in FIG. 6. The selection of this geometry may be based, in part, on the amount of required space within the turning plenum of the platform feed structure, weight considerations, material considerations, and/or considerations related to optimizing structural concerns related to the added stiffness provided by the platform feed structure. A convex platform feed structure will have the largest internal volume of the turning plenum, as compared to a constant slope (e.g., FIG. 5) or a concave slope (e.g., FIG. 6).

As noted above, the top of the platform feed structure, in accordance with embodiments of the present disclosure, may be covered by a cover plate. Such cover plates can fluidly separate the turning plenum from the outer diameter plenum of the platform. The cover plate is configured to be installed to the top surface of the platform feed structure. In some embodiments, the cover plate may be a substantial flat sheet of metal or other material that is welded, adhered, bonded, or otherwise attached to the top surface of the platform feed structure (or mechanically coupled thereto). As such, the shape of the cover plate, in such embodiments, is a continuous or smooth surface that is a sheet that fits over and onto the top surface of the platform feed structure. In other embodiments, the cover plate can include features that aid in the turning of cooling flow as it transitions from an axial flow to a radial flow and thus reduce pressure losses associated with turning of flow that is directed into an airfoil or baffle of the vane assembly.

Figure 7A:
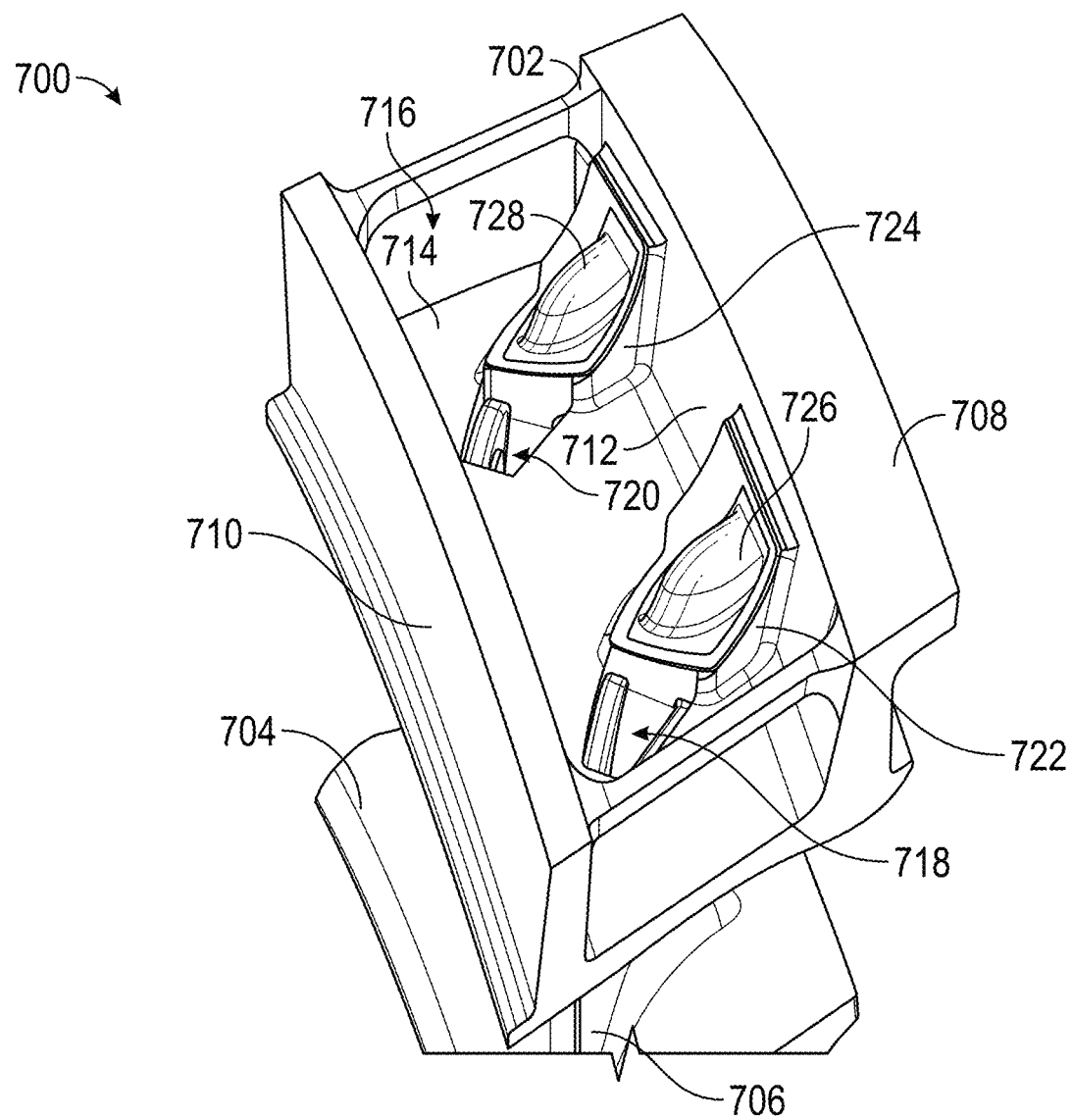
FIG. 7A is a schematic illustration of a vane assembly in accordance with an embodiment of the present disclosure including cover plates.
Figure 7B:
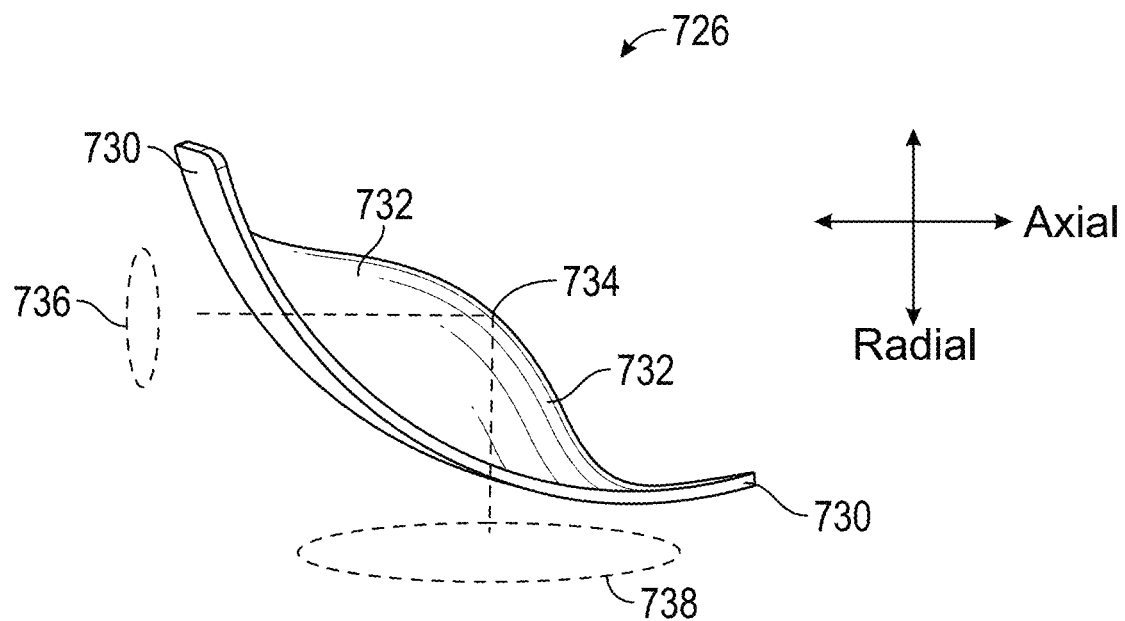
FIG. 7B is a schematic illustration of a cover plate of FIG. 7A.
Figure 7C:
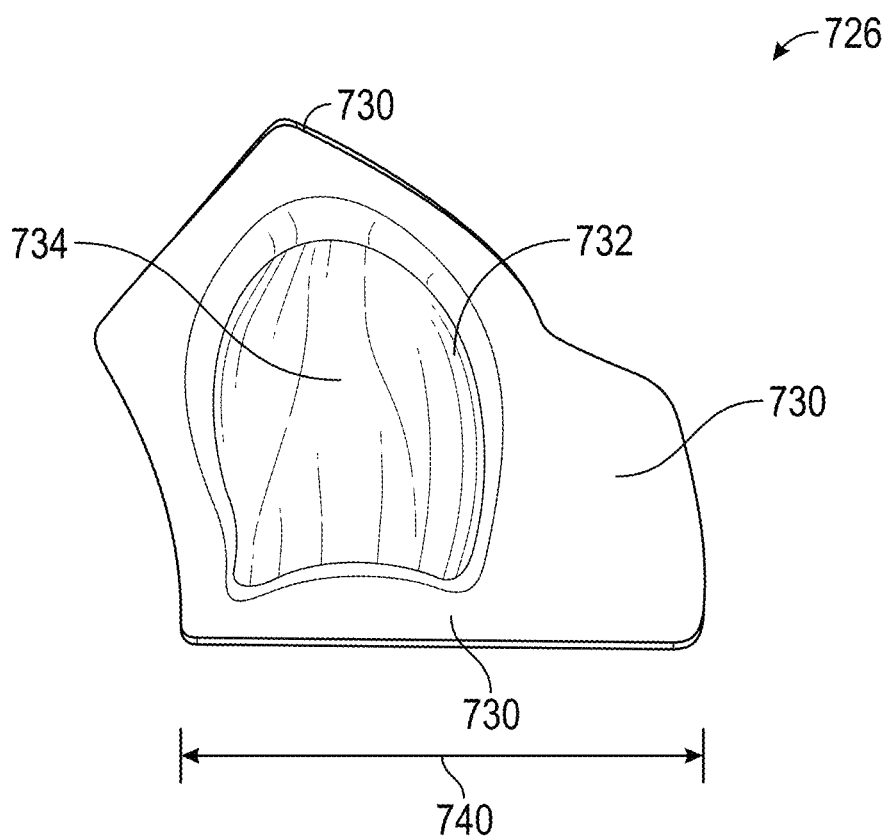
FIG. 7C is a schematic illustration of an alternate view of the cover plate of FIG. 7B.

Turning now to FIGS. 7A-7C, schematic illustrations of a vane assembly 700 in accordance with an embodiment of the present disclosure is shown. The vane assembly 700 may be similar to that shown and described above. For example, the vane assembly 700 includes an outer diameter platform 702, an inner diameter platform 704, and an airfoil 706 extending radially between the outer diameter platform 702 and the inner diameter platform 704. The outer diameter platform 702 includes a forward rail 708 and an aft rail 710. The forward rail 708 has an interior rail surface outlet 432 that directs cooling air into the baffle 412 and the outer diameter platform 702 has an interior platform surface 714. The interior rail surface 712, the interior platform surface 714, and an interior rail surface of the aft rail 710 define an outer diameter plenum 716, similar to that shown and described above.

In this embodiment, the vane assembly 700 includes two airfoils, the airfoil 706 illustratively shown having a forward leading edge cavity and an aft cavity 718. A second airfoil is arranged adjacent the first airfoil 706 and has an aft cavity 720 illustratively shown. Cooling flow may enter the aft cavities 718, 720 of the airfoils 706 through openings that are exposed to the outer diameter plenum 716. The cooling flow that is directed into the aft cavities 718, 720 may not be of sufficient temperature or pressure for cooling leading edge cavities of the airfoils 706. Accordingly, the vane assembly 700 includes platform feed structures 722, 724 arranged radially outward from the leading edge cavities of the airfoils 706. The platform feed structures 722, 724 are configured to direct a cooling flow of sufficient pressure and/or temperature into leading edge cavities of the airfoils 706.

The radially oriented platform feed structures 722, 724 are configured as shown and described above, having inlets arranged on and through the leading edge forward rail 708 and cover plates 726, 728 that are configured to direct and turn an axial flow to a radial flow into the leading edge cavities. In this illustrative embodiment, the platform feed structures 722, 724 have concave top surfaces (e.g., as described above) and the cover plates 726, 728 have similar curvature to ensure a seal between the cover plates 726, 728 and the top surfaces of the platform feed structures 722, 724.

Referring to FIGS. 7B-7C, schematic illustrations of the cover plate 726 are shown, with the other cover plate 728 being substantially similar thereto. The illustrations of FIGS. 7B-7C are of the cover plate 726 in isolation without other features of the radially oriented platform feed structures 722, 724 shown. As shown in FIGS. 7B-7C, the cover plate 726 includes a mounting surface 730 that is shaped to overlay a top surface of a respective platform feed structure 722, 724 such that the mounting surface 730 may be bonded, adhered, welded, mechanically affixed, or otherwise attached in a sealing manner to the top surface of the respective platform feed structure 722, 724.

The cover plate 726 includes a turning contour surface 732 that is shaped to turn an airflow from an axial flow direction to a radial flow direction. For example, and as shown, the turning contour surface 732 defines a dome-like shape that extends outward from the mounting surface 730. As shown in FIG. 7B, an apex 734 of the turning contour surface 732 is configured to align with both an inlet 736 of the platform feed structure 722 in the forward rail 708 and an outlet 738 of the platform feed structure 722 that directs cooling air into a baffle installed within a leading edge cavity of the airfoil 706, as described above.

The cover plate 726, as shown, is formed into a shell or dome shape to provide a cushion for high Mach number flow and turn such flow 90° from an axial flow direction to a radial flow direction into the airfoil or a baffle in the airfoil. Such turning contour surface 732 allows for more variety in the cooling circuit used in the leading edge of the airfoil without suffering extreme pressure losses due to turns. That is, the turning contour surface 732 provides for a smoother turning transition as compared to prior configurations. The height of the cover plate "dome" (i.e., the position of the apex 734) can be adjusted to align with the feed height of the flow (e.g., the inlet 736) and can vary in radius to allow for turning the flow more quickly or over a larger area to ensure uniform pressure distribution into the cavity of the airfoil (leading edge cavity and/or baffle cavity). The cover plate 726 can have a circumferential span 740 that can be selected to cover additional or larger platform feed structures (e.g., a second feed path that extends between an inlet in the forward rail and an outlet that directs cooling air into a platform cooling cavity, as shown in FIGS. 4A-4C).

In some embodiments, the platform feed structures may be configured to provide feed supply of cooling air into not just the leading edge cavity (and/or the platform cooling). For example, in some embodiments, the structure of the radially oriented platform feed structures 722, 724 shown in FIG. 7A may extend aft to also cover or include the aft cavities 718, 720, such as a mid-body and/or trailing edge cavity of the airfoil (including, for example, baffles therein). As such, embodiments of the present disclosure are not limited to just supplying cooling air into leading edge cavities/baffles of airfoils but can extend aftward to cover and supply air into aft cavities such as mid-body cavities and/or trailing edge cavities.

Figure 8A:
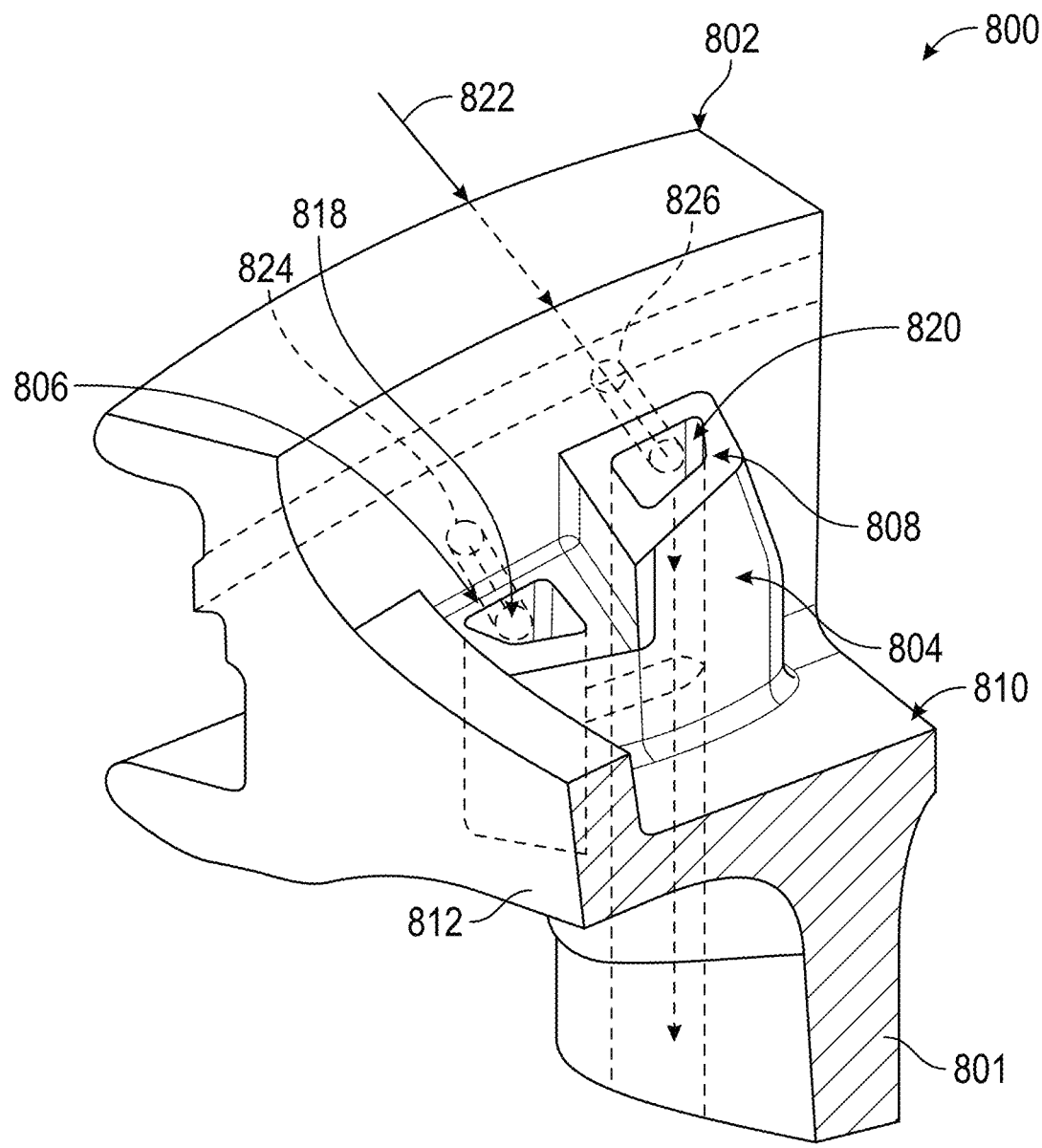
FIG. 8A is a schematic illustration of a vane assembly in accordance with an embodiment of the present disclosure.
Figure 8B:
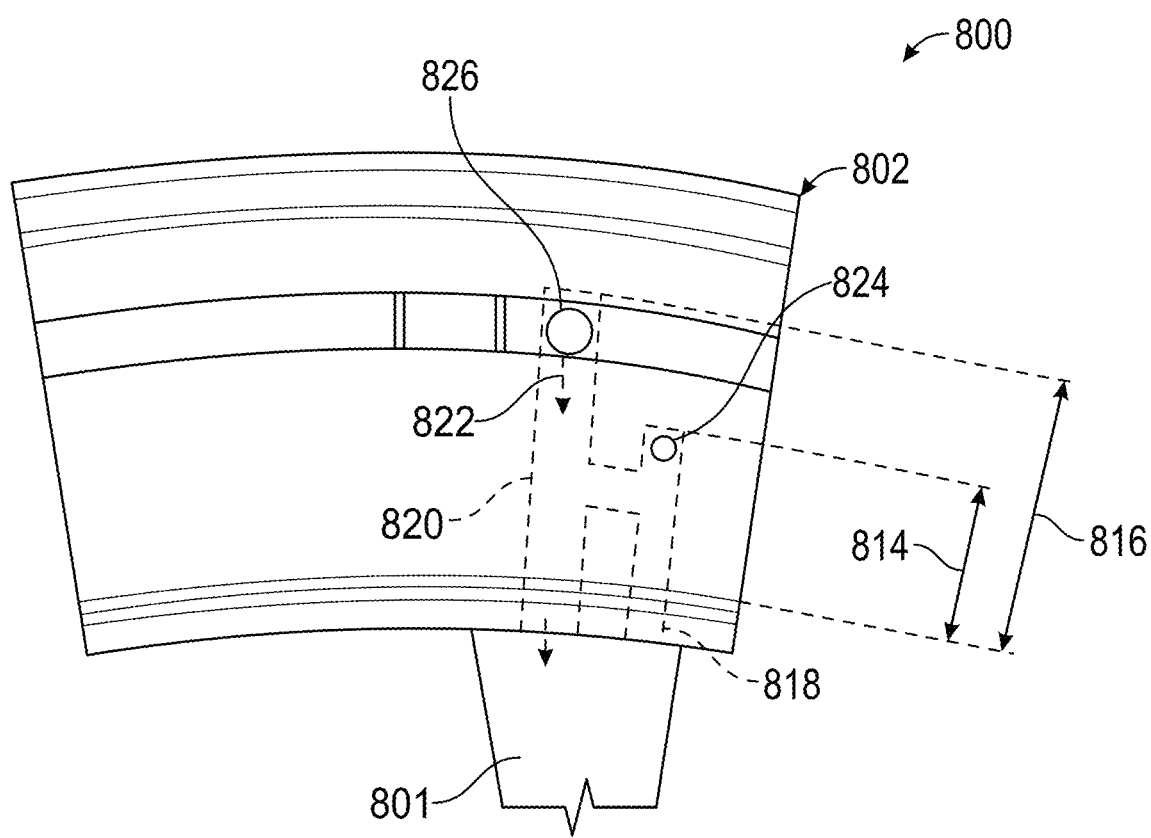
FIG. 8B is a front elevation (looking aft) of the vane assembly of FIG. 8A.

Referring now to FIGS. 8A-8B, schematic illustrations of examples of a vane assembly 800 in accordance with an embodiment of the present disclosure are shown. The vane assembly 800 includes an airfoil 801 and a forward rail 802. The forward rail 802 may be located within a compressor section or a turbine section of a gas turbine engine, as shown and described above. The forward rail 802 may operate to position and constrain the vane assembly 800 in an engine static structure. The forward rail 802 includes a radially oriented platform feed structure 804. The radially oriented platform feed structure 804 has a first radially oriented extension 806 and a second radially oriented extension 808. Each of the first radially oriented extension 806 and the second radially oriented extension 808 extends from an interior platform surface 810 of a platform 812. The first radially oriented extension 806 extends from the interior platform surface 810 of the platform 812 to define a first height 814 and the second radially oriented extension 808 extends from the interior platform surface 810 of the platform 812 to define a second height 816. In this example, the first height 814 and the second height 816 are not of heights that are substantially equal to one another. In such configurations, a pair of cover plates (not shown) may be mounted to top surfaces of the first radially oriented extension 806 and/or the second radially oriented extension 808 to close off a respective cavity defined therein.

The first radially oriented extension 806 includes a portion of an outer diameter platform supply cavity 818 and the second radially oriented extension 808 includes a portion of an airfoil leading edge supply cavity 820. It is to be understood that the term "outer diameter platform" as used herein refers to a platform located further away from an engine central longitudinal axis, such as the engine central longitudinal axis A, in comparison to an inner diameter platform. The outer diameter platform supply cavity 818 and the airfoil leading edge supply cavity 820 of the platform feed structure 804 are arranged, at least partially, within the forward rail 802 to assist in routing cooling air, as represented by arrow 822, from a location forward of the leading edge forward rail 802 into the outer diameter platform supply cavity 818 and the airfoil leading edge supply cavity 820. In this example, the outer diameter platform supply cavity 818 and the airfoil leading edge supply cavity 820 are in fluid communication with one another. In other embodiments, the two supply cavities 818, 820 may be fluidly separate from each other.

In some embodiments, and as shown in FIGS. 8A-8B, the radially oriented platform feed structure 804 may include a first inlet 824 and a second inlet 826 formed in the forward rail 802. The first inlet 824 is open to the outer diameter platform supply cavity 818 and the second inlet 826 is open to the airfoil leading edge supply cavity 820. Each of the inlets 824, 826 is open to a respective cavity and allows cooling air (e.g., the cooling air represented by arrow 822) to flow directly into a respective cavity. The outer diameter platform supply cavity 818 is configured to direct a cooling flow into a platform cooling cavity. The airfoil leading edge supply cavity 820 is configured to direct a cooling flow into a leading edge cavity of the airfoil 801. In this embodiment, the airfoil 801 may not include a baffle installed therein. As such, in this embodiment, the cooling flow is directed directly into a leading edge cavity of the airfoil 801. In other configurations, the outer diameter platform supply cavity 818 and the airfoil leading edge supply cavity 820 may be fluidly coupled and supplied with a single source of cooling air (e.g., through the second inlet 826—being the only inlet in such a configuration).

Figure 9:
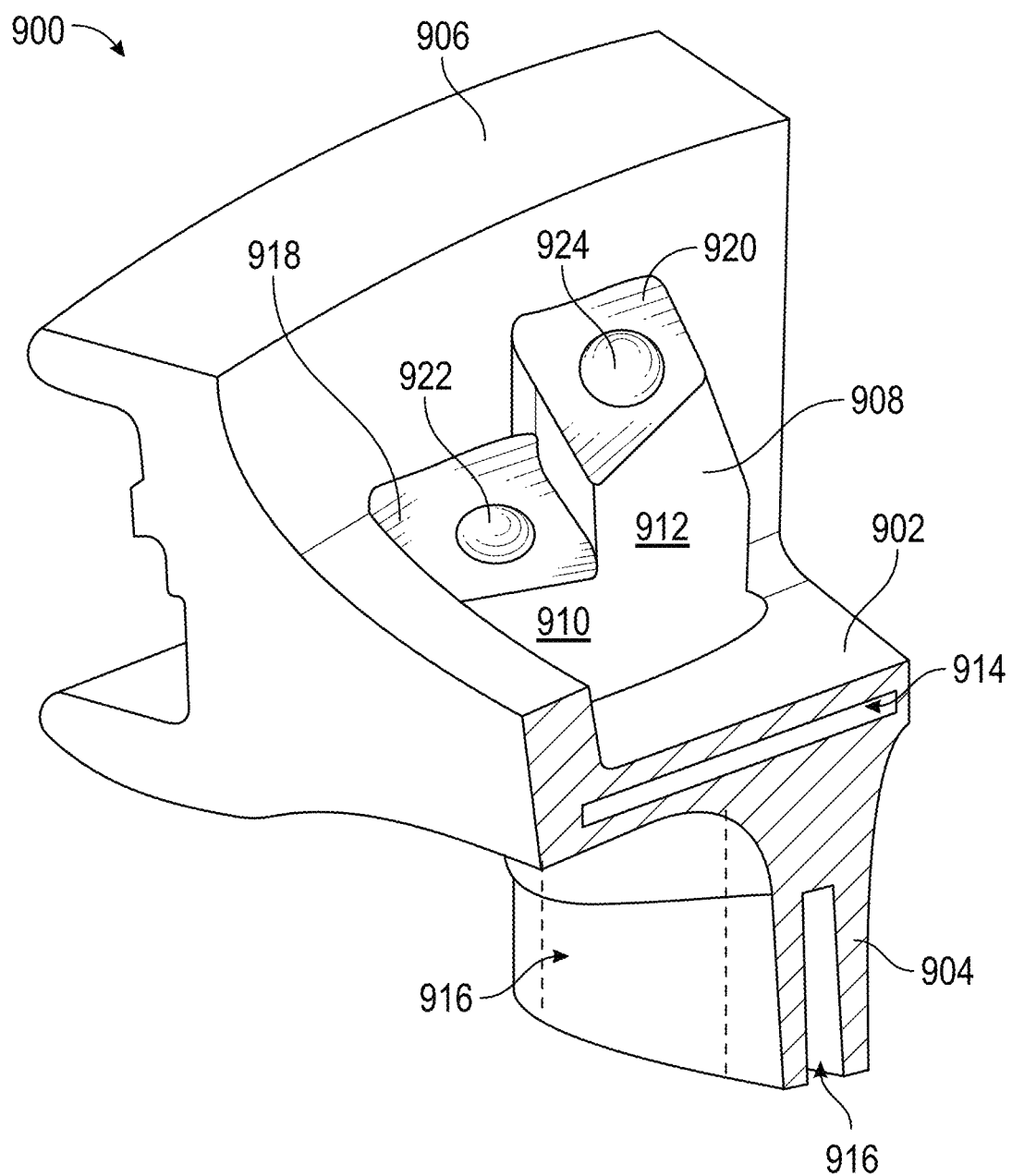
FIG. 9 is a schematic illustration of a vane assembly in accordance with an embodiment of the present disclosure including cover plates.

Turning now to FIG. 9, a schematic illustration of a vane assembly 900 in accordance with an embodiment of the present disclosure is shown. The vane assembly 900 includes a platform 902 with an airfoil 904 extending radially inward therefrom and a forward rail 906. The platform 902 includes a platform feed structure 908 arranged thereon against the forward rail 906. The platform feed structure 908 has a first extension 910 and a second extension 912. In this embodiment, the first extension 910 is a structure having an internal cavity configured to direct cooling flow to a platform cooling cavity 914 and the second extension 912 is a structure having an internal cavity configured to direct cooling flow to a leading edge cavity 916 of the airfoil 904.

In this embodiment, a first cover plate 918 is attached to cover a top of the first extension 910 and a second cover plate 920 is attached to cover a top of the second extension 912. The cover plates 918, 920 may be mounted to top surfaces of the respective first and second extensions 918, 920 to close off respective cavities defined therein. In some embodiments, the cover plates 918, 920 may be similar to that shown and described with respect to FIGS. 7A-7C, including respective turning contour surfaces 922, 924 that can aid in efficiently turning an axial direction cooling flow to a radial direction cooling flow into the respective platform cooling cavity 914 and leading edge cavity 916. In this embodiment, the airfoil 904 does not include a baffle within the leading edge cavity 916. Accordingly, a top opening of the platform 902 about the airfoil 904 is not required to be enlarged to enable installation of such baffle. As a result, the axial profile of the platform feed structure 908 (i.e., length axial distance from the forward rail 906) may be less than the configurations shown and described with respect to FIGS. 4A-6, for example. For example, because a baffle is not required to be accommodated, an axial length or extent of the platform feed structure 908 may be less than 20% of an axial length of the platform (e.g., distance between a forward rail and an aft rail of the platform).

Advantageously, embodiments of the present disclosure allow for more variety in cooling configuration options for the leading edge of airfoils of vane assemblies. In accordance with some embodiments of the present disclosure, the axial extent of platform feed structures has been increased as compared to prior configurations for improved cooling in both the axial and circumferential directions. The enlarged platform feed structures allow flow more room to make a 90° turn required by the feed system, thus reducing pressure losses and attempting to simulate a plenum for more uniform distribution of the flow into the cavity of a baffle or airfoil. Additionally, prior platform feed structures were subject to plugged feed holes due to particulates (e.g., dirt). However, advantageously, the platform feed structures permit relatively large feed slots that minimize the risk of plugged feed holes, thus reducing the risk of starving the entire circuit (which leads to burning).

Further, advantageously, in accordance with some embodiments, improved cover plates for platform feed structures are provided. The geometric features of the cover plates, in combination with the platform feed structures, allows a flow to be introduced into a cooling circuit in a controlled, predictable, and uniform capacity at varying levels of Mach number with minimized pressure loss. The more uniform distribution allows flexibility in where and how the flow is introduced and used within the airfoil itself. Previous technologies utilize flat cover plates which can cause unpredictability and non-uniform pressure distributions depending on the Mach number and feed size being used. Without the contoured cover plates described herein, it becomes more difficult to simulate a plenum distribution with higher Mach number flow.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein. It should be appreciated that relative positional terms such as "forward," "aft," "upper," "lower," "above," "below," and the like are with reference to normal operational attitude and should not be considered otherwise limiting.

While the present disclosure has been described with reference to an example embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vane assembly for a gas turbine engine, the vane assembly comprising:
   a platform having an interior platform surface, a forward rail, and an aft rail, wherein the interior platform surface, the forward rail, and the aft rail define a plenum;
   an airfoil extending radially inward from the platform on a side opposite the forward and aft rails, the airfoil having a leading edge cavity that defines an opening in the platform;
   a platform feed structure arranged on the platform about the opening of the leading edge cavity and arranged in the plenum and defining a fluid path through an inlet in the forward rail and into an outlet in the platform that is open to the leading edge cavity of the airfoil; and
   a cover plate arranged on a top surface of the platform feed structure, the cover plate configured to fluidly separate the plenum of the platform from the leading edge cavity of the airfoil and define a turning plenum, wherein the cover plate comprises a mounting surface for mounting to the top surface of the platform feed structure and a turning contour surface that extends from the mounting surface and is dome-shaped to turn an airflow from an axial flow direction to a radial flow direction within the turning plenum;
   wherein the turning contour defines an apex on the cover plate that is aligned with each of the inlet and the outlet of the platform feed structure.

2. The vane assembly of claim 1, wherein the platform feed structure has an open top that is defined by the top surface and the cover plate is attached to the top surface.

3. The vane assembly of claim 2, wherein the cover plate is attached to the top surface by one of welding, bonding, and adhesive.

4. The vane assembly of claim 1, wherein the top surface is substantially planar extending from a forward position on an interior rail surface of the forward rail and an aft position on the interior platform surface of the platform.

5. The vane assembly of claim 1, wherein the outlet is aligned with the leading edge cavity of the airfoil.

6. The vane assembly of claim 1, wherein the top surface defines a contoured surface extending from a forward position on an interior rail surface of the forward rail and an aft position on the interior platform surface of the platform.

7. The vane assembly of claim 6, wherein the contoured surface is convex.

8. The vane assembly of claim 6, wherein the contoured surface is concave.

9. The vane assembly of claim 1, wherein the platform feed structure defines a first feed path through the platform feed structure from the forward rail to the leading edge cavity and a second feed path through the platform feed structure from the forward rail to a platform cooling cavity of the platform.

10. The vane assembly of claim 9, wherein the first feed path is defined through a first extension of the platform feed structure and the second feed path is defined through a second extension of the platform feed structure, wherein the cover plate is positioned over a portion of at least the first feed path.

11. The vane assembly of claim 10, wherein the first extension and the second extension have different heights relative to the interior platform surface.

12. The vane assembly of claim 1, wherein the platform feed structure extends at least 20% of an axial distance between the forward rail and the aft rail.

13. The vane assembly of claim 1, wherein the platform feed structure extends between 20% and 70% of an axial distance between the forward rail and the aft rail.

14. The vane assembly of claim 1, wherein the platform feed structure extends less than 20% of an axial distance between the forward rail and the aft rail.

15. The vane assembly of claim 1, wherein the airfoil comprises an aft cavity arranged aft of the leading edge cavity, wherein the aft cavity is fluidly connected to the plenum of the platform.

16. The vane assembly of claim 1, wherein the platform is an outer diameter platform and the airfoil extends radially inward to an inner diameter platform.

17. The vane assembly of claim 1, wherein the platform feed structure is sized to allow a baffle to pass therethrough to install the baffle within the leading edge cavity of the airfoil.

* * * * *